(12) United States Patent
Sundberg et al.

(10) Patent No.: US 8,053,710 B2
(45) Date of Patent: Nov. 8, 2011

(54) METHOD OF MAKING A HEATING ELEMENT OF THE MOLYBDENUM SILICIDE TYPE AND A HEATING ELEMENT

(75) Inventors: Mats Sundberg, Västerås (SE); Hans Pettersson, Hallstahammar (SE); Anders Magnusson, Västerås (SE)

(73) Assignee: Sandvik Intellectual Property Aktiebolag, Sandviken (SE)

( * ) Notice: Subject to any disclaimer, the term of this patent is extended or adjusted under 35 U.S.C. 154(b) by 0 days.

(21) Appl. No.: 10/510,145

(22) PCT Filed: Mar. 6, 2003

(86) PCT No.: PCT/SE03/00379
§ 371 (c)(1),
(2), (4) Date: Apr. 19, 2005

(87) PCT Pub. No.: WO03/087014
PCT Pub. Date: Oct. 23, 2003

(65) Prior Publication Data
US 2005/0236399 A1 Oct. 27, 2005

(30) Foreign Application Priority Data
Apr. 5, 2002 (SE) ..................................... 0201042

(51) Int. Cl.
*H05B 3/10* (2006.01)
*H01C 17/00* (2006.01)
(52) U.S. Cl. ....... 219/553; 219/548; 219/552; 29/610.1; 29/611
(58) Field of Classification Search .................. 219/270, 219/260, 552, 541, 530, 553; 338/217; 29/610.1, 29/611
See application file for complete search history.

(56) References Cited

U.S. PATENT DOCUMENTS

| | | | | |
|---|---|---|---|---|
| 2,955,145 A * | 10/1960 | Schrewelius | ................. | 136/239 |
| 2,992,959 A * | 7/1961 | Schrewelius | ............... | 428/539.5 |
| 3,269,806 A | 8/1966 | Fitzer et al. | .................... | 338/333 |
| 3,607,475 A * | 9/1971 | Schrewelius | ................. | 216/101 |
| 3,662,222 A * | 5/1972 | Ray | ............................... | 219/260 |
| 3,725,091 A * | 4/1973 | Chyung et al. | ............. | 428/539.5 |
| 4,101,724 A * | 7/1978 | Heine et al. | .................... | 373/117 |
| 4,555,358 A | 11/1985 | Matsushita et al. | ........... | 252/516 |
| 5,420,399 A * | 5/1995 | Sekhar et al. | ................ | 219/553 |
| 5,708,408 A | 1/1998 | Sundberg | ..................... | 338/306 |
| 5,750,958 A * | 5/1998 | Okuda et al. | .................. | 219/267 |
| 5,756,215 A * | 5/1998 | Sawamura et al. | ........... | 428/446 |
| 6,482,759 B1 | 11/2002 | Sundberg et al. | ............. | 501/96.3 |
| 6,563,095 B1 * | 5/2003 | Sundberg | ..................... | 219/553 |
| 6,707,016 B2 | 3/2004 | Sundberg | ..................... | 219/548 |
| 6,720,530 B2 * | 4/2004 | Taniguchi et al. | ............ | 219/270 |
| 6,723,969 B1 * | 4/2004 | Beatson | ....................... | 219/553 |
| 2004/0056021 A1 | 3/2004 | Sundberg | ..................... | 219/548 |
| 2004/0094535 A1 | 5/2004 | Sundberg | ..................... | 219/548 |
| 2004/0156772 A1 | 8/2004 | Sundberg et al. | ............. | 423/324 |

FOREIGN PATENT DOCUMENTS

| | | | |
|---|---|---|---|
| GB | 795004 | | 5/1958 |
| JP | 05089946 A | * | 4/1993 |
| JP | 05315057 A | * | 11/1993 |
| SE | 204116 | | 5/1966 |

* cited by examiner

*Primary Examiner* — Stephen Ralis
(74) *Attorney, Agent, or Firm* — Alfred J. Mangels

(57) ABSTRACT

A molybdenum silicide type-heating element and a method of manufacturing a heating element of the molybdenum silicide type. The heating element contains substantially $Mo(Si_{1-x}Al_x)_2$ and $Al_2O_3$ and is prepared by mixing a molybdenum aluminum silicide-type material $Mo(Si_{1-y}Al_y)_2$ with $SiO_2$, wherein the $SiO_2$ has a purity of at least 98%.

4 Claims, No Drawings

METHOD OF MAKING A HEATING ELEMENT OF THE MOLYBDENUM SILICIDE TYPE AND A HEATING ELEMENT

BACKGROUND OF THE INVENTION

1. Field of the Invention

The present invention relates to a method of manufacturing a heating element of the molybdenum silicide type and also to a heating element.

2. Description of the Related Art

An electrical resistance element of the molybdenum silicide type is described in Swedish Patent Specifications 0003512-1 and 0004329-9. According to patent specification 0003512-1 the resistance material of the heating element includes $Mo(Si_{1-x}Al_x)_2$ which contains aluminum to an extent at which the formation of pest is essentially prevented.

It has been found that when such material is operated in a temperature range of 400-600° C. no pest, or only a slight amount of pest, is formed. Pest is formed by virtue of the formation of $MoO_3$ from $MoSi_2$ and $O_2$.

The reason why the formation of pest is significantly reduced or is eliminated is due to the formation of $Al_2O_3$ on the surface of the element.

According to one preferred embodiment x lies in the range of 0.2-0.6.

The other patent specification, 0004329-9, teaches a method of increasing the useful life span of heating elements that consist chiefly of molybdenum silicide and alloys of this basic material where the element operates at high temperatures.

According to that patent specification, the heating element contains aluminum to an extent which is sufficient to maintain a stable, slowly growing layer of aluminum oxide on the surface of the heating element.

According to a preferred embodiment the heating element material contains $Mo(Si_{1-x}Al_x)_2$ where x lies in the range of 0.2-0.6.

A material of the molybdenum silicide type that contains aluminum has been found to possess improved corrosion properties at both low and high temperatures.

Such material is often produced by mixing $MoSi_2$ powder with oxidic raw material, such as aluminosilicates. When the raw material is bentonite clay, there is obtained a relatively low melting point which contributes towards so-called smelt phase sintering, which results in a dense material that contains $MoSi_2$ and a proportion of aluminum silicate corresponding to 15-20 percent by volume.

Bentonite clay has different compositions. Some bentonites include 60% by weight $SiO_2$ while some contain somewhat more than 70% by weight $SiO_2$. Although the $Al_2O_3$ content varies, it normally lies between 13-20% by weight. The melting point varies between about 1200-1400° C.

Bentonite clay that contains chiefly $SiO_2$ can be used in the production of heating elements containing $Mo(Si_{1-x}Al_x)_2$. When sintering with an Al-alloyed silicide there takes place a chemical exchange reaction in which the greater affinity of the oxygen to Al than to Si results in Si leaving the aluminum silicate and entering the silicide as a result of Al leaving the silicide and being taken up by the oxide phase. This exchange reaction also contributes towards improved sintering properties of the composite material. The final material contains $Mo(Si_{1-x}Al_x)_2$ that is substantially depleted of Al, where the oxide phase contains $Al_2O_3$ in all essentials.

The standard procedure of manufacture involves mixing molybdenum, silicon, and aluminum in powder form and firing the powder mix normally under a shielding gas atmosphere. This results in a cake of the material $Mo(Si_{1-y}Al_y)_2$, where y is larger than x in the above formula as a result of said exchange reaction. The reaction is exothermic. The cake is then crushed and ground down to a fine particle size normally in the order of 1-20 μm. The resulting powder is mixed with bentonite clay to form a wet ceramic material. The material is extruded and dried to a rod form whose diameter corresponds to the diameter of the subsequent element. The material is then sintered at a temperature that exceeds the melting temperature of the included components.

However, there is a drawback with a heating element of that kind. The problem is that the oxide that forms on the surface of the element, namely $Al_2O_3$, sometimes peels away or flakes off, i.e., loosens from the surface of the element, in the case of cyclic operation.

A peeling oxide gives poorer protection against continued oxidation of aluminum which becomes impoverished in the outer surface of the element more quickly. Moreover, a peeling oxide can contaminate the oven in which the element is fitted, with the risk that performance and the appearance of products heat treated in ovens that have such elements will be significantly impaired. This restricts the use of such elements in heating processes.

This problem is solved by the present invention.

SUMMARY OF THE INVENTION

The present invention thus relates to a method of producing a heating element substantially of the molybdenum silicide type and alloys of this basic material, and is characterized by producing a material that substantially contains $Mo(Si_{1-x}Al_x)_2$ and $Al_2O_3$ by mixing a molybdenum aluminosilicide $Mo(Si_{1-y}Al_y)_2$ with $SiO_2$ wherein $SiO_2$ has a purity of at least 98%.

Further, the invention relates to a heating element of the disclosed type in which Re or W is partially substituted for molybdenum in the $Mo(Si_{1-x}Al_x)_2$ material.

The invention will now be described in more detail in the following description.

DESCRIPTION OF THE PREFERRED EMBODIMENTS

In accordance with the invention, a heating element that is composed chiefly of molybdenum silicide and alloys of this basic material is produced by mixing a powder that chiefly contains $Mo(Si_{1-y}Al_y)_2$ with highly pure $SiO_2$. Pure silicon dioxide has a melting temperature of about 1700° C. When using $SiO_2$, however, said exchange reaction between Si in the oxide and Al in the silicide results in a high density sintered product.

The mentioned $SiO_2$ can be present as pure $SiO_2$ or as an aluminum silicate of high purity. However, $SiO_2$ can be included in silicates in which other substances in the silicate have properties which prevent the molybdenum silicide from being alloyed with the substance or substances concerned and with which the symmetry of crystal lattice of the molybdenum silicide will be retained. Mullite and sillimanite are examples of conceivable materials in this regard.

The present invention thus replaces the bentonite clay with silicon dioxide, therewith excluding the transfer of impurities in the bentonite clay, such as Mg, Ca, Fe, Na, and K, to the heating element, thus eliminating the negative effects of such impurities on the function of said element.

It is possible to partly substitute molybdenum with Re or W in the material $Mo(Si_{1-x}Al_x)_2$ without changing the symmetry of the crystal lattice.

It has been found surprisingly that there is obtained with low contaminant contents an oxide which does not peel after cyclic operation between room temperature and high temperatures, for instance 1500° C.

According to one embodiment x is caused to lie in the range of 0.4-0.6.

According to one preferred embodiment x is caused to lie in the range of 0.45-0.55.

The present invention thus solves the problem mentioned in the introduction and enables the present heating element to be used beneficially in ovens without detriment to the material treated in the oven.

The present invention shall not be considered to be limited to the above-described embodiments, since variations can be made within the scope of the accompanying claims.

What is claimed is:

1. A method of producing a molybdenum-silicide-based heating element, said method comprising the steps of:
providing powdered molybdenum aluminosilicide material;
mixing the powdered molybdenum aluminosilicide material with $SiO_2$ selected from the group consisting of pure $SiO_2$, pure aluminum silicate, and silicates in which other substances in the $SiO_2$ have properties that prevent alloying of the other substances with molybdenum silicide, and with which the symmetry of the crystal lattice of the molybdenum silicide is retained to provide a heating element material mixture, wherein the $SiO_2$ that is present in the heating element material mixture is at least 98% pure, and wherein the heating element material mixture is free of bentonite and excludes impurities that contain Mg, Ca, Fe, Na, and K;
forming a heating element from the heating element material mixture to provide a formed heating element; and
sintering the formed heating element, wherein after sintering the formed heating element contains substantially $Mo(Si_{1-x}Al_x)_2$ and $Al_2O_3$, wherein x lies in the range of 0.45-0.55, and the sintered heating element includes on its surface an oxide layer consisting essentially of $Al_2O_3$ that does not peel from the surface of the sintered heating element under thermal cycling of the sintered heating element between room temperature and about 1500° C., so that heating oven contamination in the form of peeled oxide layer particles from the formed heating element within a heating oven containing the formed heating element is prevented under thermal cycling of the sintered heating element between room temperature and about 1500° C.

2. A method according to claim 1, including the step of partially substituting at least one of Re and W for molybdenum in the aluminosilicide material.

3. A method according to claim 1, wherein the $SiO_2$ is present as high purity mullite.

4. A method according to claim 1, wherein the $SiO_2$ is present as high purity sillimanite.

* * * * *